United States Patent [19]

Walch, Jr. et al.

[11] 4,191,172

[45] Mar. 4, 1980

[54] THERMOSTATIC MIXER VALVE

[75] Inventors: Robert L. Walch, Jr., Newfane; Van P. Carey, N. Tonawanda; Michael J. Thomas, Lockport, all of N.Y.

[73] Assignee: General Motors Corporation, Detroit, Mich.

[21] Appl. No.: 907,879

[22] Filed: May 19, 1978

[51] Int. Cl.² .............................................. F24J 3/02
[52] U.S. Cl. .................................... 126/421; 165/18; 165/104 S; 236/93 R; 126/427
[58] Field of Search ....................... 126/270, 271, 400; 237/1 A; 165/40, 18, 104 S; 236/93 R

[56] References Cited

U.S. PATENT DOCUMENTS

| | | | |
|---|---|---|---|
| 4,019,495 | 4/1977 | Frazier | 126/271 |
| 4,052,000 | 10/1977 | Honikman | 126/271 |
| 4,064,867 | 12/1977 | Schlesinger | 126/400 |

FOREIGN PATENT DOCUMENTS 1241220  5/1967  Fed. Rep. of Germany ............. 239/93

Primary Examiner—James C. Yeung
Attorney, Agent, or Firm—K. H. MacLean, Jr.

[57] ABSTRACT

In a solar energized hot water heating system, valve means responsive to the heated output from the solar heater for directing heated water alternately between a pair of storage tanks. The valve means includes a thermostatic element responsive to water temperature with capabilities to direct heated water above a predetermined temperature to one of two storage tanks and to the other when below said temperature. The valve has a multi-use function to also mix cold water with the heated output prior to use to produce a desired lower temperature.

2 Claims, 3 Drawing Figures

THERMOSTATIC MIXER VALVE

This invention relates to a hot water system of the type utilizing a solar collector to produce heated water. Particularly, multi-use valving means are described in combination with a pair of storage tanks and a water outlet to direct the heated water output from the solar collector in an efficient manner.

It is expected that future domestic as well as commercial hot water systems will include a solar heat collecting source augmenting heating by gas or electrical energy. To this end, a solar collector system employing a heat exchanger is contemplated. The heat exchanger will have one pass therethrough for a non-potable heat transfer fluid, such as ethylene glycol, which is circulated through the solar collector. The other pass through the heat exchanger will be for potable water. The heated potable water will be stored in two storage tanks and will be directed to one or the other dependent upon the water temperature as heated by the exchange from the heat transfer fluid. A large reserve tank will be utilized to store relatively low temperature potable water while a smaller immediate use tank will be utilized to store higher temperature potable water. The immediate-use tank will likely contain an auxiliary heating source such as an electrical coil.

Multi-use valve means are proposed between the outlet of the heat exchanger and the tanks. A temperature responsive automatic control element within the valving device proportions the flow from the heat exchanger either to the reserve tank or the immediate-use tank. The immediate-use tank includes an auxiliary heating means such as an electric coil to bring the water temperature to a desired output temperature of say 140° F. On a sunny day, even in winter, the heated output from a properly designed and proportioned solar collector may exceed 180° F. At this temperature, it is desirable to discharge the heated water resulting therefrom directly into the immediate-use tank. On a clouded winter day, the heated water from the solar collector and the heat exchanger may be less than 140°, or say 110° F. If this 110° water were to be discharged directly into the immediate-use tank, it would have the effect of causing the energization of the auxiliary heating element. Thus large quantities of electrical or gas heating capacity might be used. Consequently, it is desirable to discharge any heated water from the solar collector and heat exchanger into the reserve tank when its temperature is below the predetermined temperature at which the auxiliary heating coil is activated.

After several days of persistent cloudy weather, the solar input may be decreased so as to require the temperature of potable water to be heated. As water is used, cold water enters the reserve tank. It should be understood that in the aforementioned discussion, the indicated temperatures were intended as an example only and other temperatures might be set and found to be more desirable.

The multi-use regulating valve may be also used at the outlet of the immediate use tank which may contain water of relatively high temperature. The valve is also connected to the cold water supply source and to the home water distribution system which may lead to a faucet. Obviously, it would be undesirable and wasteful to discharge water from a faucet or other dispensing device at high temperature of say 180° F. Therefore, the multi-use valve automatically mixes cold potable water with the hot potable water to produce water at say 120° F. which is hot enough for practically any use in the home. Thus the subject solar energized hot water heating system with the multi-use control valve provides a very desirable heating system with a substantial potential to conserve energy.

Therefore, an object of the present invention is to provide a domestic hot water heating system utilizing solar energy components and automatic valving devices which distribute the heated output therefrom in a desirable manner for purposes of maximizing heat realized from the solar energy source.

A further object of the present invention is to provide a domestic hot water heating system utilizing solar heaters and dual heat storage facilities one of which is equipped with an auxiliary heat source and an automatic valve means to alternately direct the heated output from the solar heaters so as to minimize energization of the auxiliary heat source.

Further objects and advantages of the present invention will be more readily apparent from a reading of the following detailed description, reference being had to the accompanying drawings in which a preferred embodiment of the water heating system is illustrated.

Figure 1:
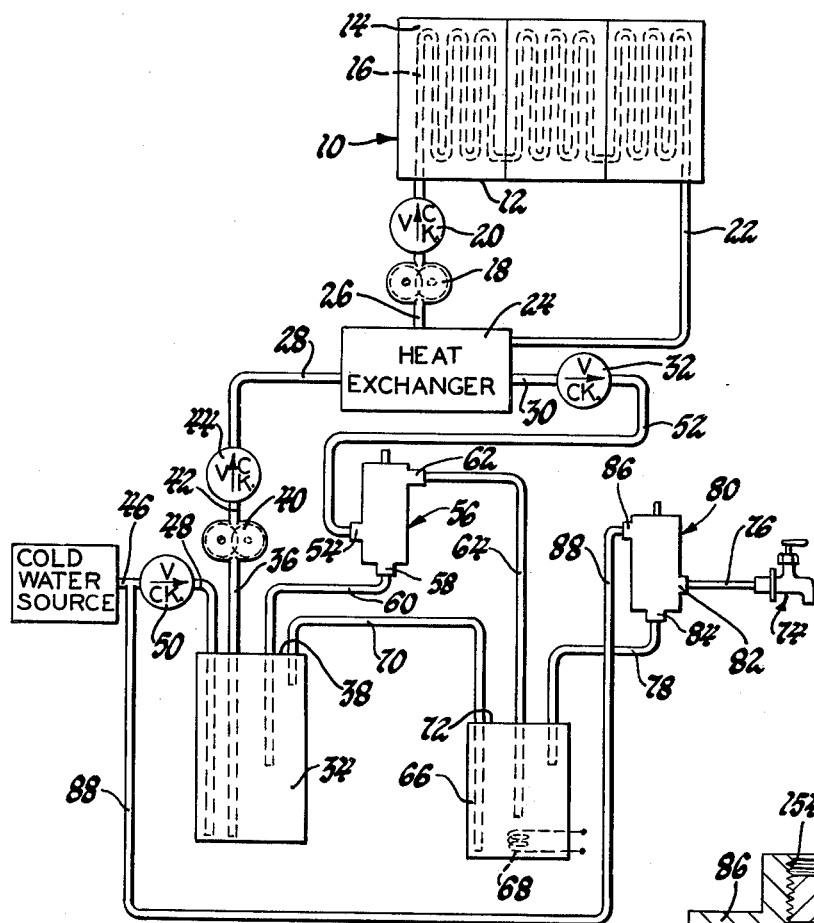
FIG. 1 is a somewhat schematic view of a solar heating system for domestic hot water.

In FIG. 1 of the drawings, a domestic hot water system is schematically illustrated. The hot water system includes provision for heating by the collection of solar energy. To collect solar energy, a collector assembly 10 is illustrated which is shown in three portions or parts. Each portion has a frame 12 supporting a metal plate 14 to which a serpentine shaped coil of tubing or conduit 16 is attached in good heat transfer relation thereto. The tubing 16 directs a flow of anti-freeze fluid or ethylene glycol through the three solar collector portions in series. A pump 18 provides the flow creating operation. A check valve 20 ensures that the glycol flows in only one direction indicated by arrows in FIG. 1. The panels 14 are generally painted black to absorb heat energy from the sun. The coils 16 transmit the solar heat to the fluid flowing therethrough. Frame 12 may be formed of many materials, but a particularly desirable collector structure is disclosed in U.S. Ser. No. 805,412 which was filed June 10, 1977 and is assigned to the General Motors Corporation. Heated fluid from the solar collectors 10 flows through a discharge line 22 to a heat exchanger 24. The glycol fluid exits the heat exchanger through an outlet conduit 26 and then flows to pump 18. The heat exchanger 24 provides fluid passes therein adapted to permit the simultaneous flows of potable water and glycol. Water enters the heat exchanger through inlet 28 and is discharged through outlet 30. A check valve 32 downstream from the outlet 30 prevents backflow of potable water through the heat exchanger.

Water flows to the heat exchanger 24 from a large capacity reserve tank 34. Specifically, the water exits from tank 34 through an outlet conduit 36 extending through the top surface 38 of tank 34. Conduit 36 extends downward into the tank and terminates near the bottom wall. A pump 40 connected to the conduit 36 draws water from tank 34 and pumps it through an outlet conduit 42 of the pump and through a check valve 44 to a conduit 28 and hence to the heat exchanger 24. The water level in tank 34 is automatically maintained by addition of a quantity of potable water from a cold water source through conduits 46, 48 and a check valve 50. The conduit 48 extends through the top 38 of the tank 34 and terminates near the bottom wall.

Water heated in the heat exchanger 24 then passes through conduit 30 and a check valve 32 to a conduit 52 which is connected to the inlet fitting 54 of a thermostatically responsive valve device 56. Another fitting 58 of valve 56 is connected to a conduit 60 which extends through top surface 38 of tank 34 and thus discharges water into the interior of tank 34. A third outlet fitting 62 is connected to a conduit 64 which extends into an immediate-use tank 66. The immediate-use tank 66 is preferably of smaller capacity than the reserve tank 34. The tank 66 also includes an auxiliary heating source in the form of element 68 which is for the purpose of bringing the temperature of water to a predetermined useful temperature level. As water is withdrawn from the tank 66, water is supplied from tank 34 through a conduit 70 one end of which extends through top surface 38 of tank 34 and the other end of which extends through the top surface 72 of tank 66.

The function of valve 56 is to direct a flow of water from heat exchanger 24 either to tank 34 or to tank 66 dependent upon its temperature. Details of valve 56 will be discussed hereinafter with respect to FIG. 2. Normally, it is desirable to maintain the temperature of the water in tank 66 at or above a predetermined temperature level of say 140° F. When the temperature level of water within the tank falls below this predetermined desired temperature, the heating element 68 will be automatically energized by controls (not shown) so that the temperature of the water will be increased to the predetermined temperature level.

Obviously, when the solar heat collector assembly 10 is operated during winter months when days are cloudy, the temperature output of water from the associated heat exchanger 24 may fall below the predetermined temperature. It would be undesirable to pass this relatively cool water directly into the intermediate-use tank 66 as this would cause the heat exchanger 68 to be energized. Therefore, valve 56 responds to the temperature of the water entering through conduit 52 and directs the water to the reserve tank 34 through conduit 60 when its temperature is below the predetermined temperature. When the water temperature from heat exchanger 24 is above 140° F., the water will be directed by valve 56 directly into tank 66 through conduit 64. This forces cooler water in the bottom of tank 66 to flow into tank 34

In FIG. 1, a use of warmed potable water is represented by faucet 74. Water is supplied to faucet 74 through conduits 76, 78 and a thermally responsive valve 80. The conduit 78 extends through the top surface 72 of tank 66 to withdraw water from the hotter upper portion of tank 66. The valve 80 includes a fitting 82 connected to the conduit 76 and a second fitting 84 connected to conduit 78. A third fitting 86 is connected to a conduit 88 which extends to conduit 46 which is directly connected to the cold water source. The purpose of valve 80 is to prevent the discharge of water from faucet 74 having a temperature greatly in excess of the temperature necessary for household uses. Thus, at times it may prevent the discharge of water at a temperature of say 180° F. which would be undesirable. Valve 80 will be discussed in more detail hereinafter with reference to FIG. 3. The valve 80 automatically mixes a quantity of cold water from conduit 88 with hot water from the tank 66 to provide water having a desired temperature, say about 120° F.

Figure 2:
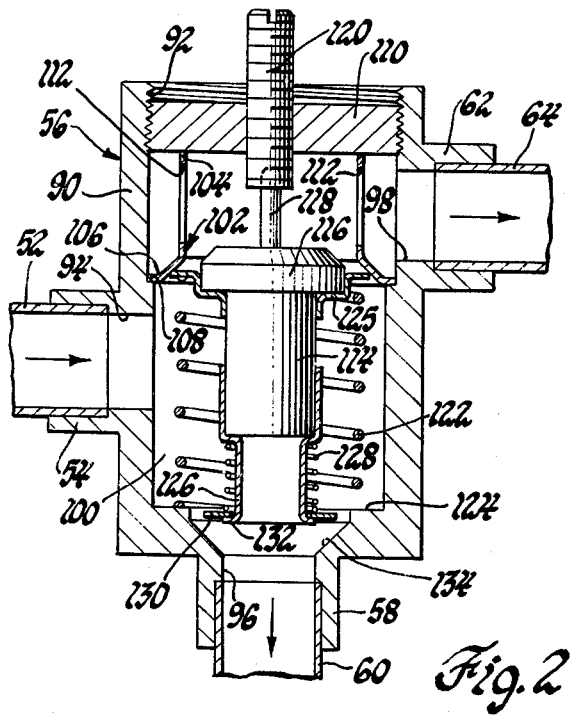
FIG. 2 is a sectioned view of the multi-use valve shown in FIG. 1 located between the heat exchanger and the reserve tank.

Relating to the valving device 56 in FIG. 2, a housing 90 is shown being generally cylindrical in configuration and having an interiorly threaded end 92. The fittings 54, 58 and 62 are connected to the conduits 52, 60 and 64 respectively. Openings 94, 96 and 98 through the housing wall 90 are provided and permit fluid to enter and exit the interior 100 of the housing 90. Between the openings 94, 96 and the opening 98, is positioned a generally cylindrical valve seat forming member 102 which has an upper edge portion 104 and a radially outward extending lower flange or edge portion 106. Portion 106 rests upon a shoulder 108 formed in housing 90. The upper edge 104 is engaged by a threaded cover member 110 fitted into the threaded opening 92 of housing 90. Member 102 includes a plurality of openings 112 so as to permit fluid flow between port 94 and 98.

A thermally responsive power element or motor 114 is within interior 100 and has a generally cylindrical configuration. The thermal motor 114 also has an enlarged head portion 116 and includes a movable pin or stem member 118 extending from the upper end thereof. The pin or stem 118 is engaged at its upper end by a member 120 which threadably extends though member 110 for calibration purposes.

The thermal motor 114 is of the general type utilized in vehicle engine cooling systems and contains a thermally expansive quantity of wax or other substance which melts with great expansion with increases in temperature. An elastomeric gasket extends through the housing and encircles the lower end of the pin or actuator portion 118. When the thermal motor 114 is subjected to a temperature increase within a range about a predetermined temperature, the wax or other substance therein is melted and the resultant expansion is utilized as a driving force. The expansion of the material presses against the sides of the rubber gasket member and thereby against the pin 118 whose lower end has a tapered configuration. This squeezing action causes the pin 118 to be moved outward from the cylindrical housing and thus elongates the motor 114. For more details of the thermal motor 114, reference is made to the power elements of automotive thermostats which are used in engine cooling systems. Representative of this type of thermal motor is the device covered by U.S. Pat. No. 2,881,616 to Clifford et al which issued Apr. 14, 1959 and is assigned to the General Motors Corporation.

The end of stem 118 presses against the lower end of adjusting screw member 120 by action of the spring 122. The spring's lower end rests against a shoulder portion 124 of a housing member 90 and its upper end presses against an annularly shaped valve member 126. The inner diameter portion of valve member 126 engages the enlarged head portion 116. An outer diameter edge portion performs a valving action with the outwardly extended portion 106 of the valve seat member 102. Thus, as the water around the thermal motor 114 increases in temperature to the predetermined temperature, the wax material contained in the motor 114 is melted and this produces elongation of the motor 114.

Consequentially, the main body portion of motor 114 moves downward in FIG. 2 against spring 122 to produce spacing between the annular valving member 125 and the valve seat member 102. This permits water to flow from the port 94 to the port 98 and thus to the intermediate-use tank 66. However, when the temperature of water is below a predetermined level of say 140° F., the substance within the power element 114 remains in its solid state and the valve member 126 seats against the valve seat member 102. This causes the water to flow from port 94 to port 96 and to the reserve tank 34.

Encircling the bottom of the power element 114 and in gripping relation thereto, a cylindrical valve support member 126 is found. Member 126 extends downward toward port 96 and in fact extends therein as the power element 114 is extended by melting of the wax material therein. A light spring 128 and annular valve member 130 are supported by the member 126 and a flared end 132 retains them. As the power element 114 moves downward, the communication between ports 94 and 96 is terminated by engagement between valve 130 and the housing. Thereafter all flow is between ports 94 and 98. The spring 128 is for over travel purposes and permits the valve member 130 to ride upward on member 126 and with respect to the flared end 132 when the power element 114 moves downward. Specifically, an inclined surface 134 of housing 90 forms a valve seat for valve 130.

Figure 3:
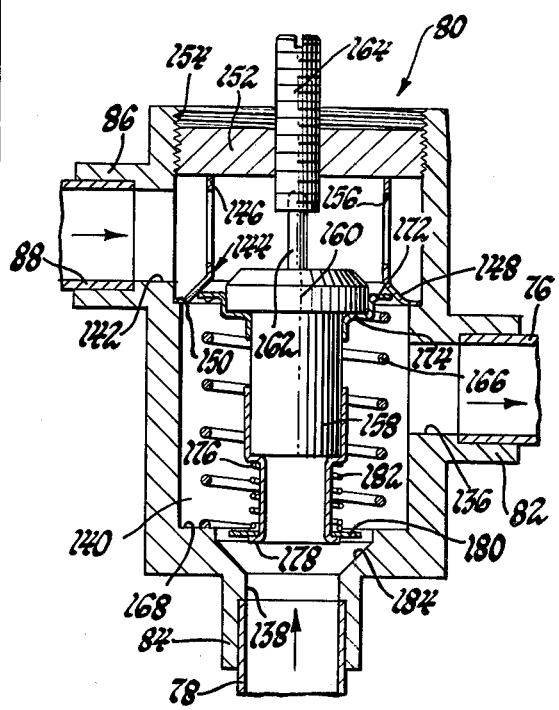
FIG. 3 is a sectioned view of the valve shown in FIG. 1 located between the immediate-use tank and a representative discharge or outlet of the heating system.

In FIG. 3, details of the thermostatically responsive valve member 80 are disclosed. Valve 80 includes inlet and outlet fittings 82, 84 and 86. Fitting 82 connects conduit 76 to the valve so as to permit the flow of water through a port 136. Fitting 84 connects the conduit 78 to the valve 80 to permit water to flow from the immediate use tank 66 through port 138 and into the interior 140 of the valve 80. Likewise, the fitting 86 connects conduit 88 to the valve 80 to permit entry of cold water through a port 142. Valve 80 is similar to the valve 56 and therefore a shortened explanation will follow.

The ports 136 and 142 are separated by a valve seat member 144 having a top edge 146 and a radially outwardly extending bottom edge 148. The edge 148 rests against a shoulder 150 and is held thereagainst by engagement of the top edge 146 by a cover member 152. Member 152 is threadably secured within an interiorly threaded end 154 of the valve housing. A plurality of openings 156 in the member 144 permit flow between ports 136 and 142.

A thermal sensing element or thermal motor 158 is supported within an interior 140. The thermal motor 158 includes an enlarged end or head portion 160 through which a pin member 162 extends in the axial direction. The upper part of the thermal motor 158 is supported by engagement between the upper end of stem 162 and a threaded adjustment or calibration member 164. The stem 162 and motor 158 is pressed up against member 164 by a coil spring 166 the lower end of which engages a shoulder portion 168. The upper end of coil spring 166 engages the outer peripheral edge portion 172 of an annularly shaped valving member 174. The inner edge portion of member 174 abuts the enlarged head 160 of the thermal motor 158. The edge portion 172 of valve member 174 engages the edge portion 148 of member 144 to perform a valving function and to block fluid flow between ports 136 and 142.

The lower end of thermal motor 158 supports a cylindrical support member 176. Its upper end encircles and grips the thermal motor 158. The lower end 178 of the support member 176 is flared outward to limit downward movement of an annular valve member 180 which is held thereagainst by a light spring 182.

When the temperature of water in the valve's interior 140 attains a predetermined temperature of say 120° F., the thermal motor 158 is elongated by movement of the pin 162 axially outward from the main portion. This operation is identical to the operation of the thermal motor 114 in FIG. 2 except for different wax material encased within the thermal motors to create different temperature sensitivity. Reference is hereby made to the aforementioned description of the thermal motor 114 and its operation. A predetermined temperature sensitivity for motor 158 of say 120° F. is thought to be desirable since this temperature should be sufficient for all uses. When the motor 158 elongates, cold water enters the lower portion of chamber 140 to mix with hot water entering from the immediate-use tank 66. Thus, excessive temperatures above about 120° F. are not passed through port 136 and to a use device such as faucet 74 in FIG. 1.

Although only one embodiment of the subject solar heat and hot water system has been illustrated and described in detail, modifications may be made without falling outside the scope of the following claims which solely define the invention.

What is claimed is as follows:

1. A solar energized hot water system comprising: storage means for potable water including a reserve tank and an immediate-use tank, a source of unheated potable water; a solar heat collector; a solar heat exchanger having one pass connected with said collector and another pass connected with said unheated water source; means including an alternate heater responsive to the water temperature in said immediate-use tank and energizable to prevent water temperature therein from falling below a predetermined temperature level; means operably connecting said solar heat exchanger with said storage means including a temperature responsive valving device to alternately direct heated water from said heat exchanger to said immediate-use tank when above said predetermined temperature and to said reserve tank when below said predetermined temperature; said valving device forming a hollow housing defining a flow path therethrough with three openings, the first receiving heated water from said solar heater, the second for passing heated water to said reserve tank and the third for passing heated water to said immediate-use tank; a thermally responsive power element and valve portion to block flow between said first and said third ports and permit flow between said first and second ports when the water temperature is below the predetermined temperature and to permit flow between said first and third ports and block flow between said first and second ports when the water temperature is above the predetermined temperature, whereby omission of direct flow of cooler water to the immediate-use tank minimizes the energization of the alternate heater.

2. A solar energized hot water system comprising: storage means for potable water including a reserve tank and an immediate-use tank, a flow line interconnecting lower heat zones of said immediate-use tank with higher heat zones of said reserve tank; a source of unheated potable water connected to said reserve tank; a solar heat collector, a solar heat exchanger having one pass connected with said collector and another pass having its inlet connected with said unheated water source, means including an alternate heater responsive to the water temperature in said immediate-use tank and energizable to prevent water temperature therein from falling below a predetermined temperature level; means operably connecting said solar heat exchanger with said storage means including a temperature responsive valving device to alternately direct heated water from the outlet of said another pass of said heat exchanger to said immediate-use tank when above said predetermined temperature and to said reserve tank when below said predetermined temperature; said valving device forming a hollow housing defining a flow path therethrough with three openings, the first receiving heated water from said solar heater, the second for passing heated water to said reserve tank and the third for passing heated water to said immediate-use tank; a thermally responsive power element and valve portion to block flow between said first and said third ports and permit flow between said first and second ports when the water temperature is below the predetermined temperature and to permit flow between said first and third ports and block flow between said first and second ports when the water temperature is above the predetermined temperature, whereby omission of direct flow of cooler water to the immediate-use tank minimizes the energization of the alternate heater.

* * * * *